United States Patent [19]

West

[11] Patent Number: 5,260,622
[45] Date of Patent: * Nov. 9, 1993

[54] HIGH RESOLUTION ELECTROMECHANICAL TRANSLATION DEVICE

[75] Inventor: Paul E. West, Cupertino, Calif.

[73] Assignee: TopoMetrix Corporation, Santa Clara, Calif.

[*] Notice: The portion of the term of this patent subsequent to Nov. 6, 2007 has been disclaimed.

[21] Appl. No.: 765,082

[22] Filed: Sep. 24, 1991

Related U.S. Application Data

[63] Continuation-in-part of Ser. No. 328,429, Mar. 24, 1989, Pat. No. 4,968,914.

[51] Int. Cl.⁵ .......................................... H01L 41/08
[52] U.S. Cl. ................................................ 310/328
[58] Field of Search .............................. 310/323, 328

[56] References Cited

U.S. PATENT DOCUMENTS

| | | | |
|---|---|---|---|
| 3,217,218 | 11/1965 | Steele | 310/328 X |
| 4,798,989 | 1/1989 | Miyazaki et al. | 310/328 |
| 4,968,914 | 11/1990 | West et al. | 310/328 |

FOREIGN PATENT DOCUMENTS

| | | | |
|---|---|---|---|
| 0148389 | 8/1985 | Japan | 310/328 |
| 0217879 | 9/1987 | Japan | 310/328 |

OTHER PUBLICATIONS

High-Speed Scanning Tunneling Microscopes, by S. Gregory et al., J. Vac. Sci Technol A 6(2) Mar./Apr. 1988 pp. 390-392.

*Primary Examiner*—Mark O. Budd
*Attorney, Agent, or Firm*—Fulwider Patton Lee & Utecht

[57] ABSTRACT

The electromechanical translation apparatus includes a translation drive assembly having front and rear drive leg members coupled together with central extension piezoelectric members, and piezoelectric clamping members which clamp the drive leg members between opposing bearing members of a lower base. The translation drive assembly may directly carry an object for precise positioning of the object, or may carry an upper movable base which in turn may be translated along an axis perpendicular to the direction of movement along the lower base, so that an object placed upon the upper movable base can be precisely positioned.

7 Claims, 11 Drawing Sheets

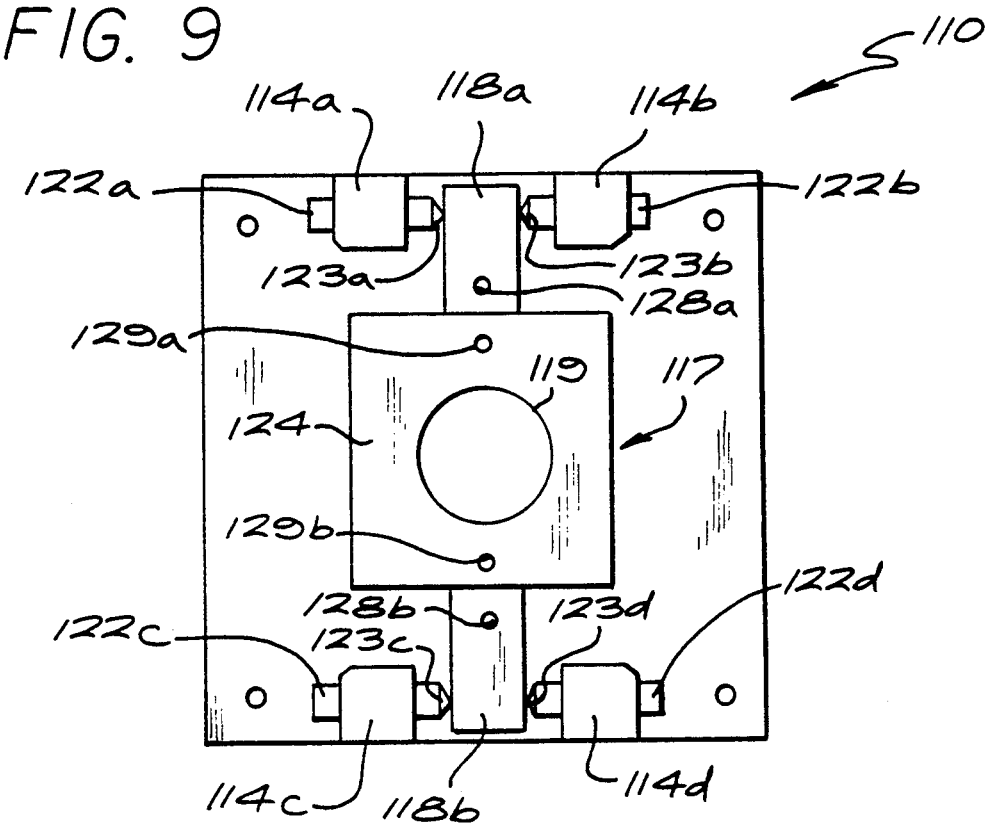
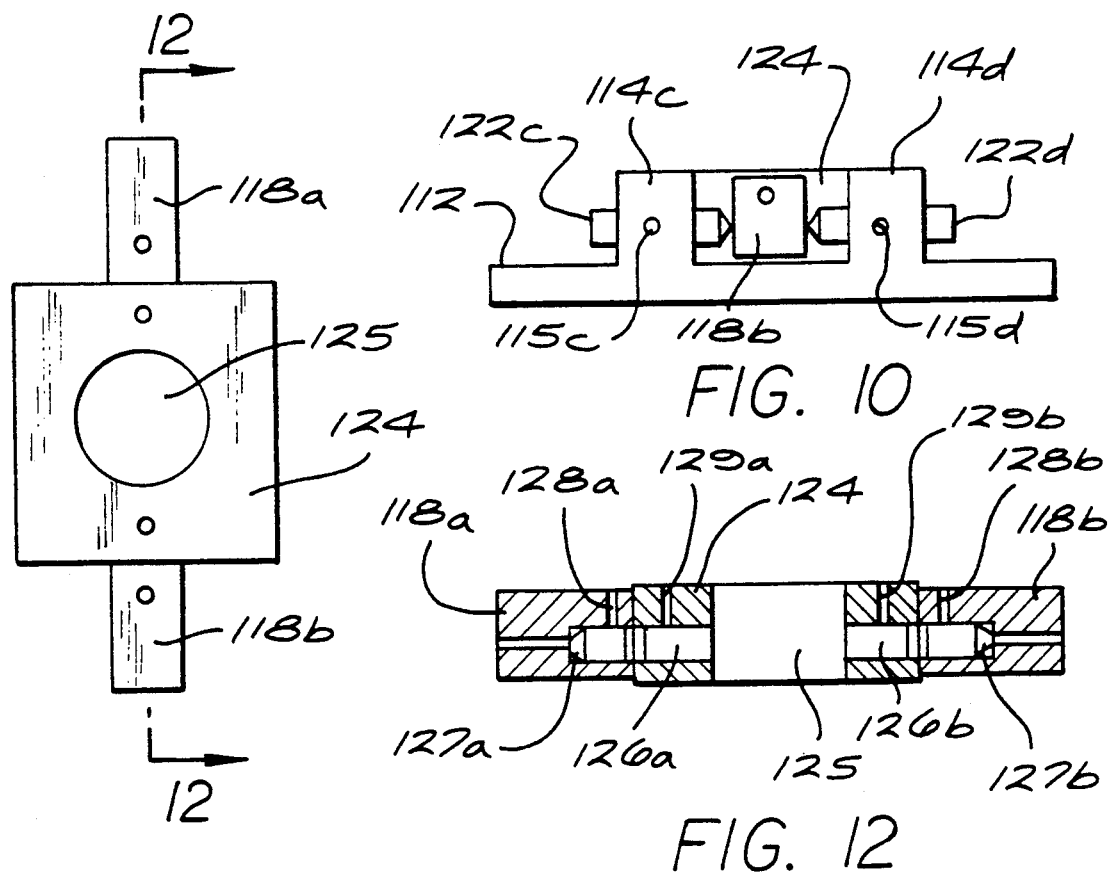

HIGH RESOLUTION ELECTROMECHANICAL TRANSLATION DEVICE

RELATED APPLICATIONS

This is a continuation-in-part of Ser. No. 07/328,429, filed Mar. 24, 1989, now U.S. Pat. No. 4,968,914, issued Nov. 6, 1990.

BACKGROUND OF THE INVENTION

1. Field of the Invention

This invention relates generally to electromechanical translation devices, and more particularly relates to an apparatus for high resolution translation in one or two dimensions that is particularly useful, for example, in high resolution positioning instruments such as microscopes and optical instruments.

2. Description of Related Art

Devices for producing precise linear or two dimensional motion are useful in scanning devices. Electromechanical transducers such as piezoelectric ceramic laminates which expand upon being subjected to an electrical current have been used for controlling the position of machine tools. Piezoelectric ceramic laminates or stacks have also been coupled between parallel plates in such a fashion that two-dimensional motion of the control devices is possible. Stepwise fine positioning adjustment is also possible when piezoeletric stacks are combined for "walking" over a flat substrate. One such channel walking device fits in grooves in a channel for translation at cryogenic temperatures. Another piezoelectric translating device is capable of carrying and moving a flat plate in either one or two dimensions.

It would be desirable to provide a positioning apparatus which insures precise translational motion of the device. It would also be desirable to provide a high resolution two-dimensional positioning apparatus having support surfaces which have less total area than the total two-dimensional scanning area, in order to reduce the time and expense of precision machining of the substrate surfaces over which the positioning device travels. The present invention fulfills these needs.

SUMMARY OF THE INVENTION

Briefly and in general terms, the translation apparatus according to the invention includes a base member having opposing bearing members, and a translation drive assembly which negotiates between the bearing members. The translation drive assembly in its simplest form includes at least two drive leg members, and means for selectively clamping the drive legs. A central drive means includes at least one expansion member coupling the drive leg members to the central body. Each of the expansion members is responsive to an electrical control signal so that each expansion member may be selectively expanded or contracted in a predetermined sequence in coordination with selective clamping of the drive legs to cause the translation drive assembly to negotiate along the stationary base member.

In a currently preferred embodiment of the invention, a movable upper base member similar to the lower stationary base member is carried by the translation drive assembly for movement along an axis perpendicular to the principal axis of travel of the drive assembly, to provide two-dimensional translational motion of the movable upper base member. It is also currently preferred that each drive leg be disposed between a pair of bearing posts, so that each drive leg can be selectively clamped between the pair of bearing posts by a pair of individually actuatable piezoelectric expansion members.

The translation apparatus thus provides a simple yet highly precise way of positioning objects, with a minimum of rotational and linear error. The bearing members of the apparatus also presents far less total surface area to be machined than the total two-dimensional scanning area, to reduce the time and expense of machining in the manufacture of the bearing surfaces, and also reduces the potential for positional errors due to imperfections in the surfaces.

Other aspects and advantages of the invention will become apparent from the following detailed description, and the accompanying drawings, illustrating by way of example the features of the invention.

BRIEF DESCRIPTION OF THE DRAWINGS

FIG. 9 is a top plan view of another embodiment of a one-dimensional translation assembly in a lower base;

FIG. 10 is a rear elevational view of the embodiment of FIG. 9;

FIG. 11 is a top plan view of the translation assembly of FIG. 9;

FIG. 12 is a cross-sectional view of the translation assembly of FIG. 11, taken along line 12—12;

DETAILED DESCRIPTION OF THE PREFERRED EMBODIMENTS

Figure 1:
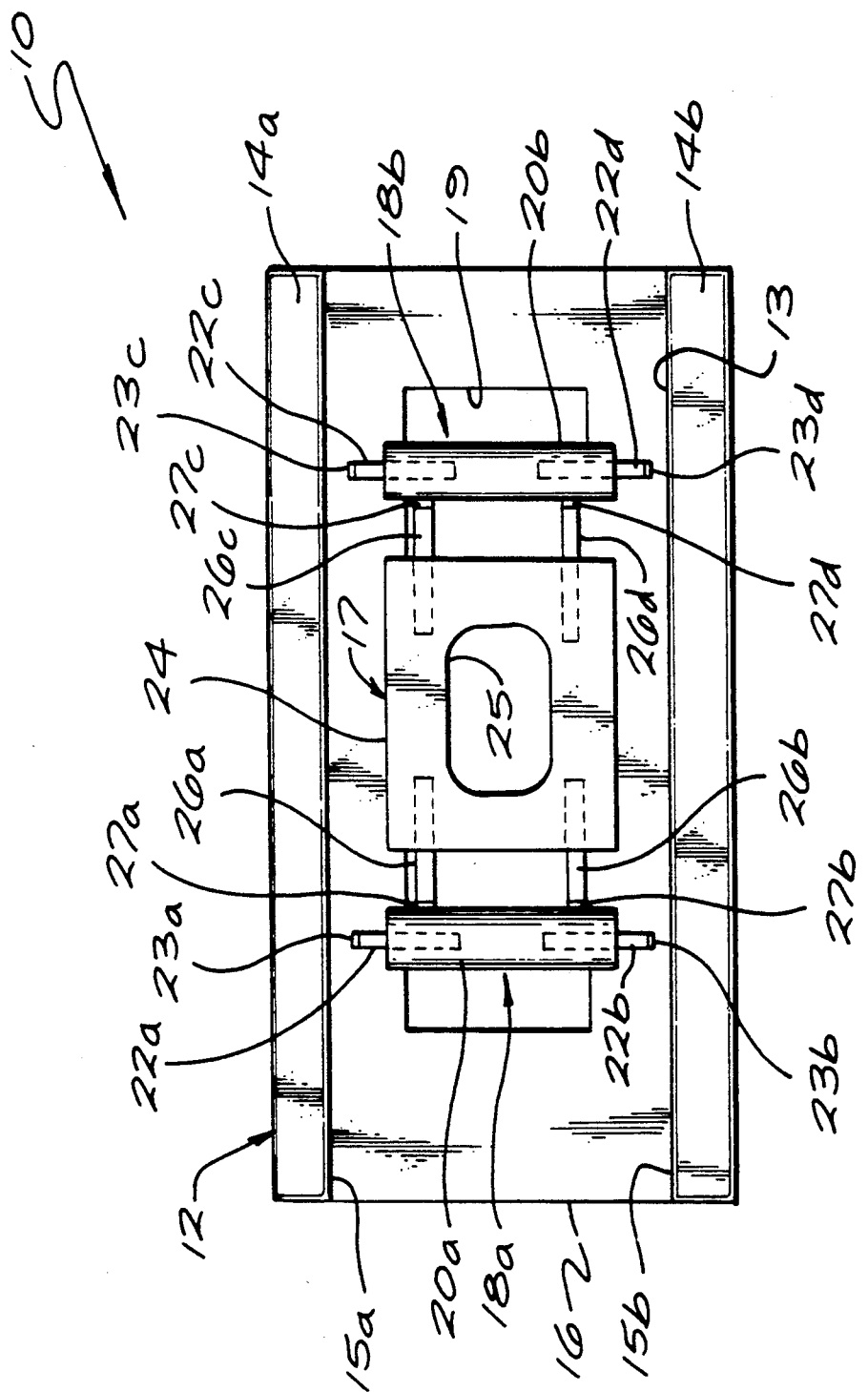
FIG. 1 is a top plan view of a one-dimensional translation assembly in a stationary base member.

As is shown in the drawings for purposes of illustration, the invention is embodied in an electromechanical translation apparatus such as is suitable for positioning a high resolution one-dimensional or two-dimensional translation stage such as may be used with high resolution microscopes. A particular use for the invention is for a one-dimensional or two-dimensional translational stage for a scanning tunneling microscope. Such microscopes are useful for imaging objects as small as atoms, so that there is a need for a stable translational positioning apparatus capable of positioning an object with extremely high resolution in either one or two dimensions with a minimum of linear or rotational error. There is also need for reduction of time, costs, and positional errors from the machining of bearing surfaces for such translational devices, which have frequently involved placement of a positioning device between grooved and highly smoothed, machined parallel plates.

As is shown in the drawings, the simplest embodiment of the invention is as a one-dimensional "channel walker" electromechanical translation apparatus 10. A stationary base member 12 is preferably placed in a stable position on a platform (not shown), or fixedly mounted to such a platform in a preferably horizontal position, with a channel opening 13 in the base member facing upward. Such horizontal positioning helps to keep the effects of gravity on the translation apparatus symmetrical. The longitudinal bearing sidewalls 14a, b include interior planar parallel bearing surfaces 15a, b, and the bearing sidewalls are preferably stably connected together, such as by a central connecting plate portion 16, having a central opening 19 therethrough, and upon which the translational drive assembly 17 rests. The bearing sidewalls need not be parallel or planar. Opposing concave bearing surfaces would be useful in retaining the translation drive assembly, as would sidewalls angling inwardly. Other bearing sidewall configurations, such as grooving, may also be useful, but generally increase the costs and difficulty of machining the sidewalls of the channel members. For example, the bearing sidewalls may be adjustably connected together, such as by bolts, for fine adjustment of tolerances.

The translation drive assembly includes a front primary drive leg 18a, and a rear primary drive leg 18b, consisting of a mounting or connector bar 20a and 20b, respectively, and expansion or drive members 22a, b, c, d which may be any common electromechanical transducers, and which are preferably piezoelectric ceramic stacks mounted within bores in the mounting bars, preferably with epoxy cement. Each of the clamping piezoelectric stacks include precisely machined feet 23a, b, c, d which are currently also preferably formed with epoxy cement, at the exterior ends of the stacks extending to the bearing surfaces of the stationary base member. Although the primary expansion or drive members are illustrated as being symmetrically positioned in the mounting bars, in pairs, the primary drive leg members would function similarly if only one front piezoelectric stack and one rear piezoelectric stack were provided.

The one-dimensional translation drive assembly also includes a central body 24, preferably having a central opening 25, and four center piezoelectric ceramic stack members 26a, b, c, d coupling the primary clamping mounting bars to the central body by bonds 27a, b, c, d. Although epoxy cement is currently preferred, other bonds, such as adhesive or mechanical fasteners would of course, be suitable. The piezoelectric ceramic stack members will expand when subjected to an electrical current, such as is well known in the art. Typically, modern multilamellar piezoelectric ceramics expand approximately 10 microns when subjected to 70-80 volts of electricity, allowing for up to 10 microns per step of the "channel walker" translation assembly. Smaller steps may be taken by reduction of the applied voltages. For simplicity, the electrical connections to the piezoelectric stacks are only illustrated in the electrical circuit diagrams. As will be readily appreciated, the channel members can be machined as one piece to have extremely flat, smooth, parallel sidewalls and a smooth base connecting portion which the translation "channel walker" assembly can negotiate with extremely high resolution.

Figure 2:
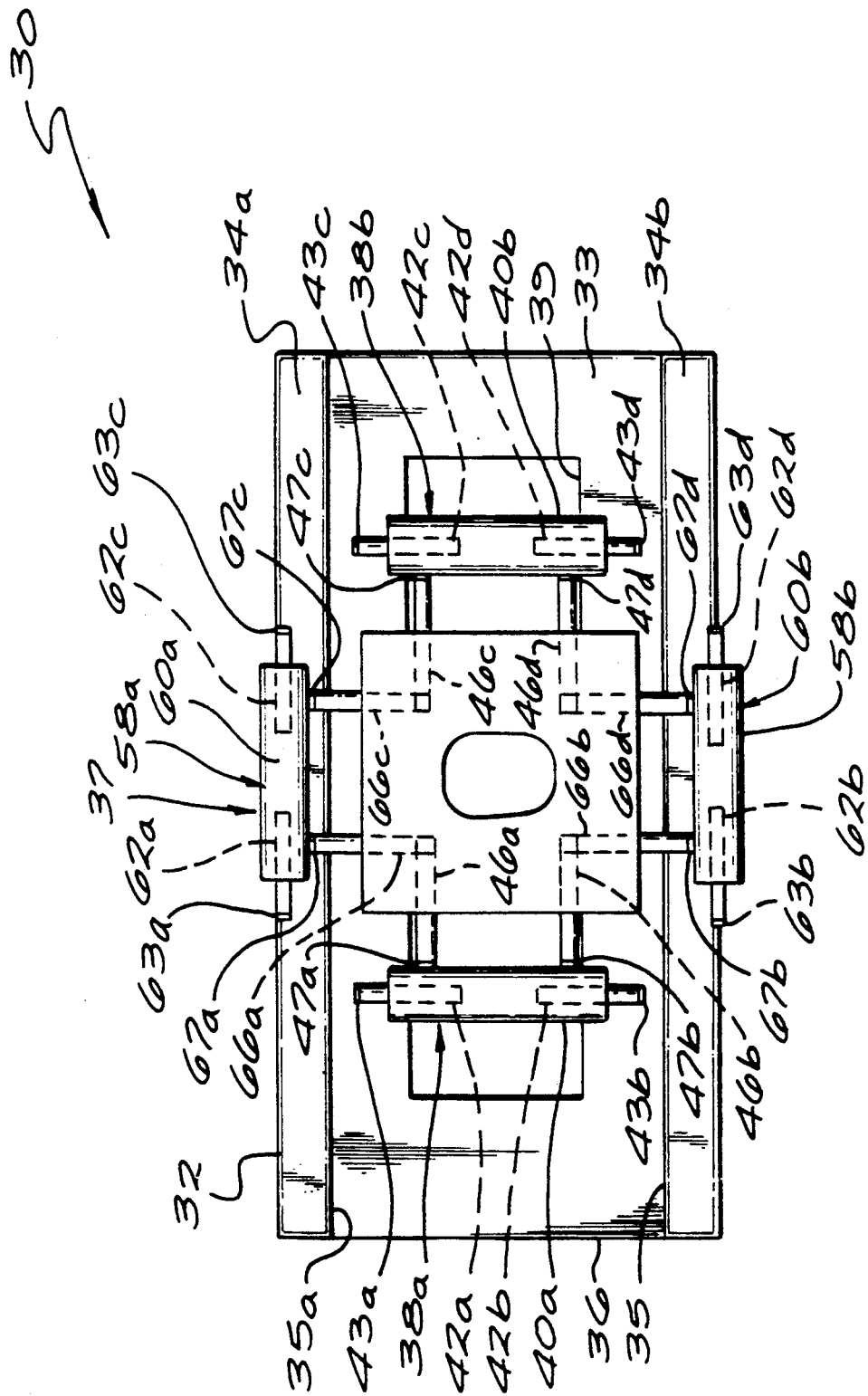
FIG. 2 is a top plan view of a second embodiment, showing a two-dimensional translation assembly in a stationary base.
Figure 3:
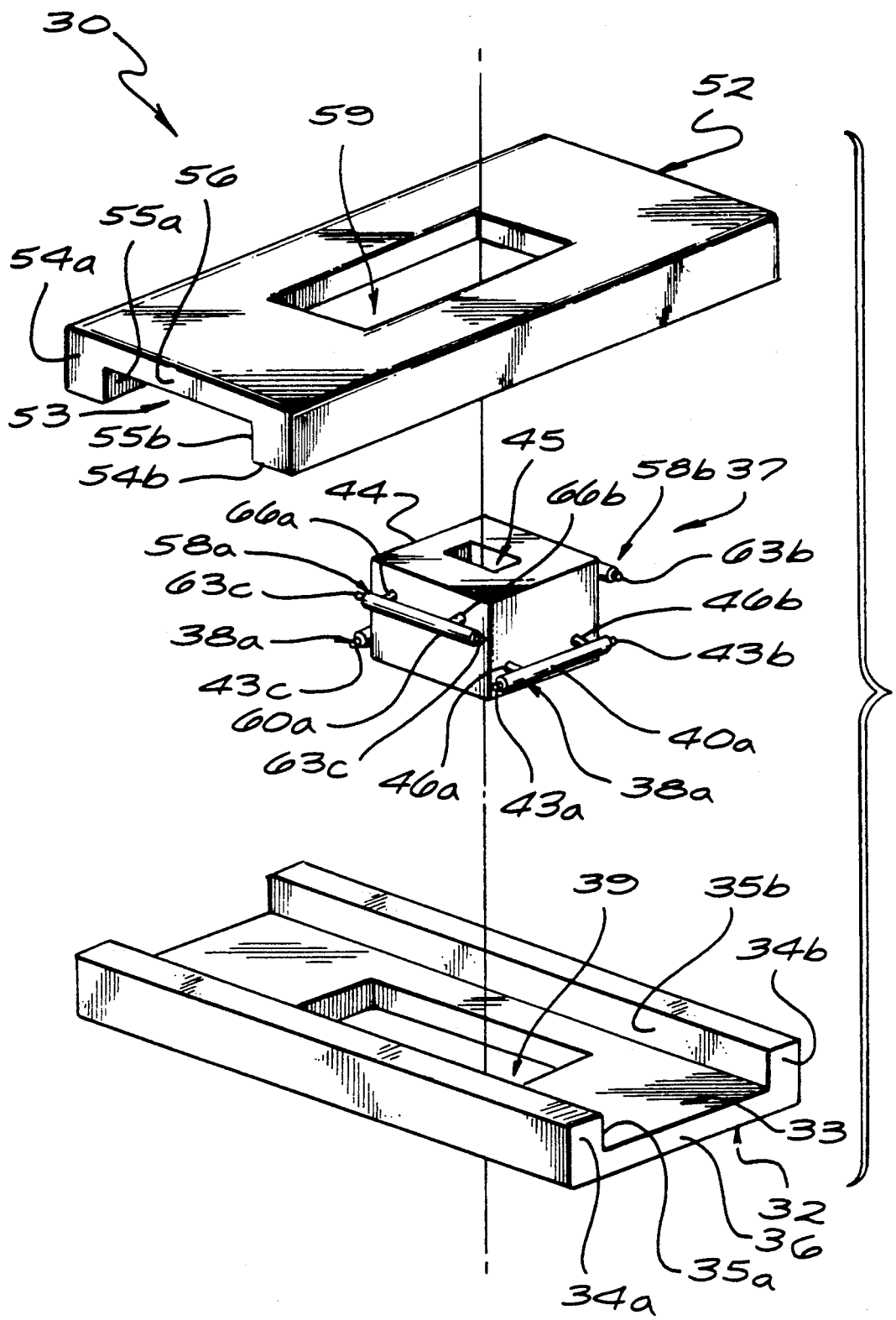
FIG. 3 is a perspective view showing placement of the upper base member over the translation assembly and lower base of FIG. 2.

The one-dimensional translation apparatus of FIG. 1 can be configured to provide a two dimensional translation stage, as is illustrated in FIGS. 2 and 3. The construction of the lower portion of the two-dimensional translational apparatus 30 is essentially the same as for the one dimensional translation apparatus described above. A stationary base member 32 is provided, having a channel 33 facing upward between two planar bearing sidewalls 34a, b, presenting planar interior parallel bearing surfaces 35a, b. The base connecting plate portion 36 between the bearing sidewalls carries the translation assembly 37.

The two dimensional translation assembly includes the front and rear drive legs 38a, b, which include front and rear connector mounting bars 40a, b, and the front and rear pairs of piezoelectric drive members 42a, b, c, and d in bores in the mounting bars, with the external feet 43a, b, c, d mounted thereon. The central body portion 44, which includes the central opening 45 therethrough, carries the four central piezoelectric ceramic stack members 46a, b, c, d. Epoxy bonds 47a, b, c, d couple the front and rear connector bars to the central body.

The upper movable base member 52 has a construction similar to that of the lower stationary base member, and includes a channel 53 between planar bearing sidewall portions 54a, b, having opposite interior planar parallel bearing surfaces 55a, b, connected together by the central base connecting plate portion 56, which also includes a central opening 59. The combination of the lower base member opening 39, the translation assembly opening 45, and the upper, movable base member opening 59 permits light to pass through these openings, so that the translation apparatus may be used as a stage for an optical microscope. The upper drive legs 58a, b, are mounted to the central body perpendicular to the lower drive legs, and include connector bars 60a, b, having the piezoelectric ceramic stack drive members 62a, b, c, d, mounted in bores in the ends of the connecting bars and the feet 63a, b, c, d mounted externally on the ends thereof. The upper central piezoelectric drive members 66a, b, c, d, and corresponding bonds 67a, b, c, d couple the upper drive legs to the central body. The upper movable base member is placed over and carried by the central body, with the upper drive legs extending between the inner sidewall bearing surfaces of the upper movable member. Each of the piezoelectric ceramic stack members is individually and selectively actuatable to expand and contract to provide the motile source for the clamping and extending functions of the translation drive assembly.

Figure 4:
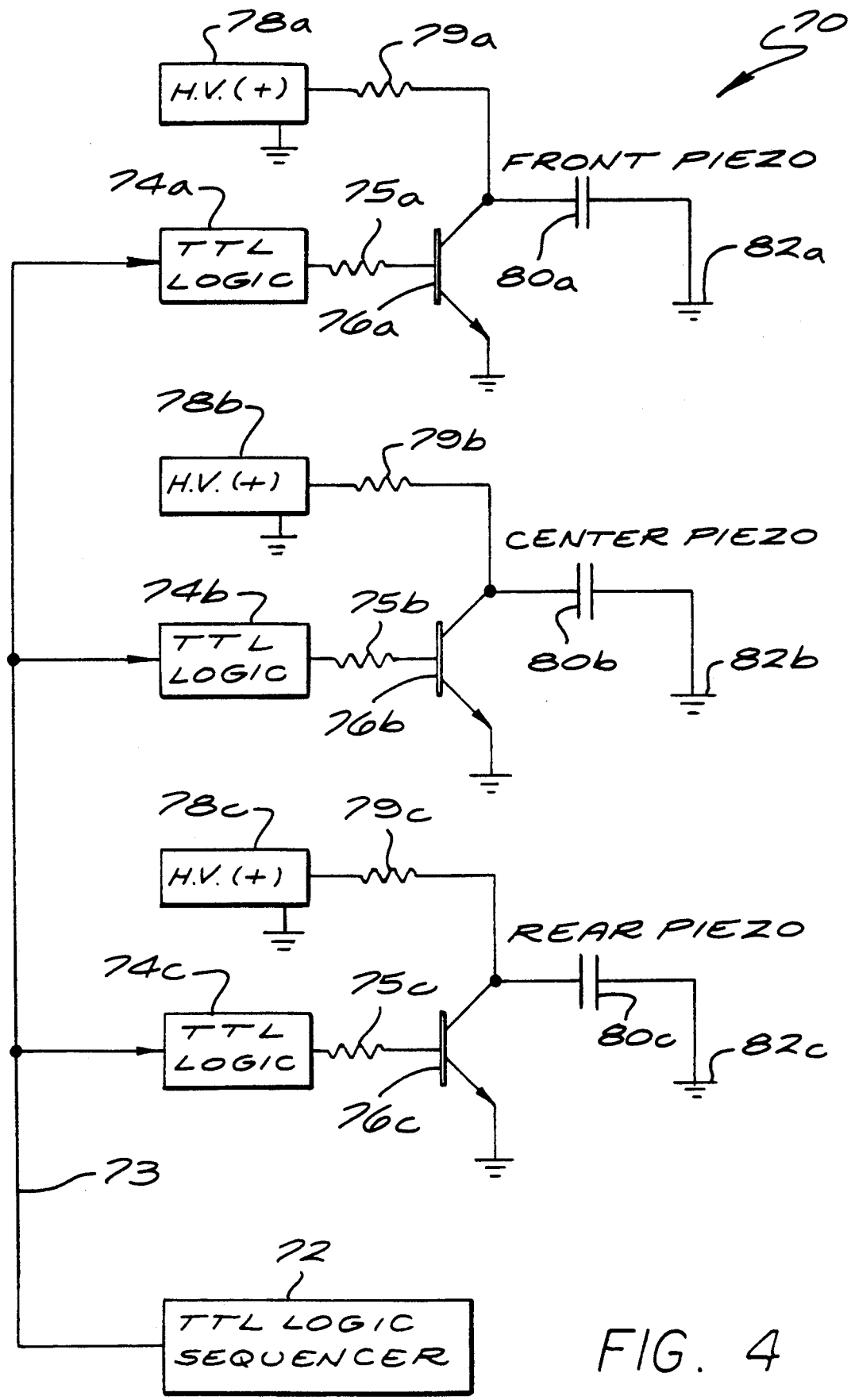
FIG. 4 is an electrical schematic diagram of a sequencer circuit for driving the translation apparatus of FIG. 1.
Figure 5:
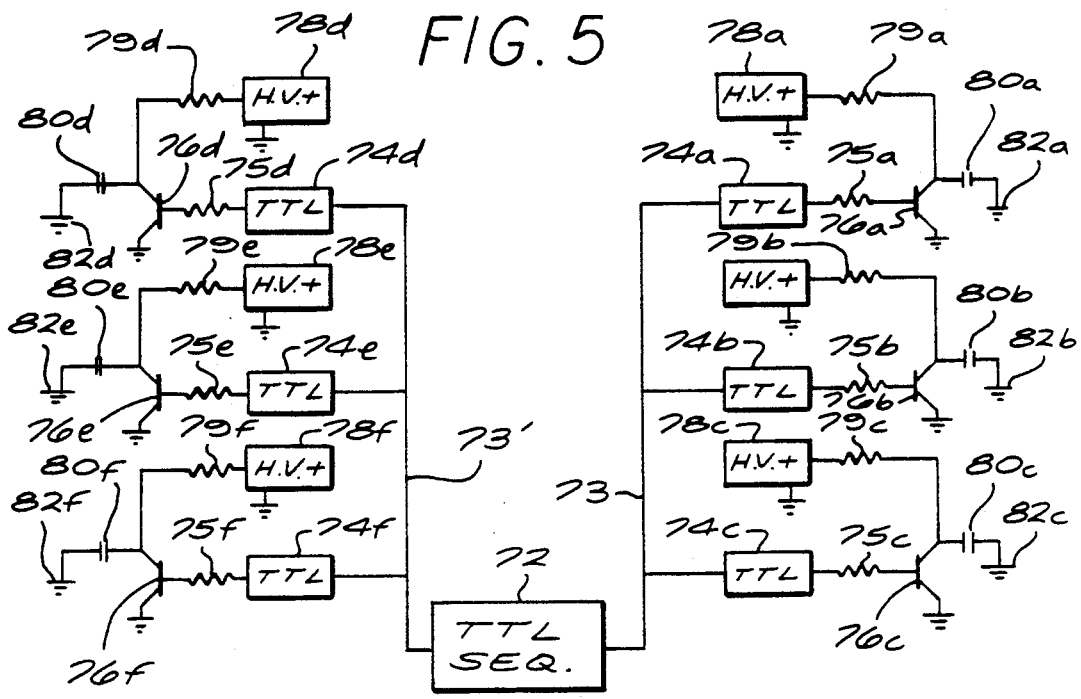
FIG. 5 is an electrical schematic diagram of a sequencer circuit for driving the two-dimensional translation assembly of FIG. 3.

To illustrate and exemplify the electrical circuitry by which each of the piezoelectric ceramic stack members of a one-dimensional translation apparatus is individually selectable for expansion and contraction, a simple electrical schematic diagram is presented in FIG. 4, for a simple case in which a translation drive assembly includes single front and rear piezoelectric stack members $P_1$ and $P_3$ for clamping action of the translation drive device, and one central piezoelectric member $P_2$ for the extension movement. These three piezoelectric transducers could also be symmetrically arranged to form a simple one dimensional translational drive device, with the central piezoelectric member $P_2$ coupling the front and rear piezoelectric transducers $P_1$ and $P_2$. Alternatively, the schematic can be viewed as directing control voltage signals to front ($P_1$), rear ($P_3$) and central ($P_2$) groups of piezoelectric drive members. Thus, in this form of the invention, the piezoelectric drive circuit 70 would include a TTL logic sequencer 72, generating electrical control signals conducted by the electrical line 73 to the TTL logic devices 74$a$, $b$, $c$. Each of the TTL logic devices is connected through a resistor 75$a$, $b$, $c$, to a transistor switch 76$a$, $b$, $c$, coupling a high voltage source 78$a$, $b$, $c$, through resistor 79$a$, $b$, $c$, which can be a variable resistor, to each individual piezoelectric transducer $P_1$, $P_2$, $P_3$ or group of piezoelectric drive members 80$a$, $b$, $c$, connected to ground 82$a$, $b$, $c$. A slightly more complicated electrical schematic diagram is illustrated in FIG. 5 for the embodiment in which there are upper piezoelectric clamping and extending members, carrying and translating the upper movable base member, and in which corresponding elements are identified with reference numerals corresponding to those in FIG. 4.

Figure 6:
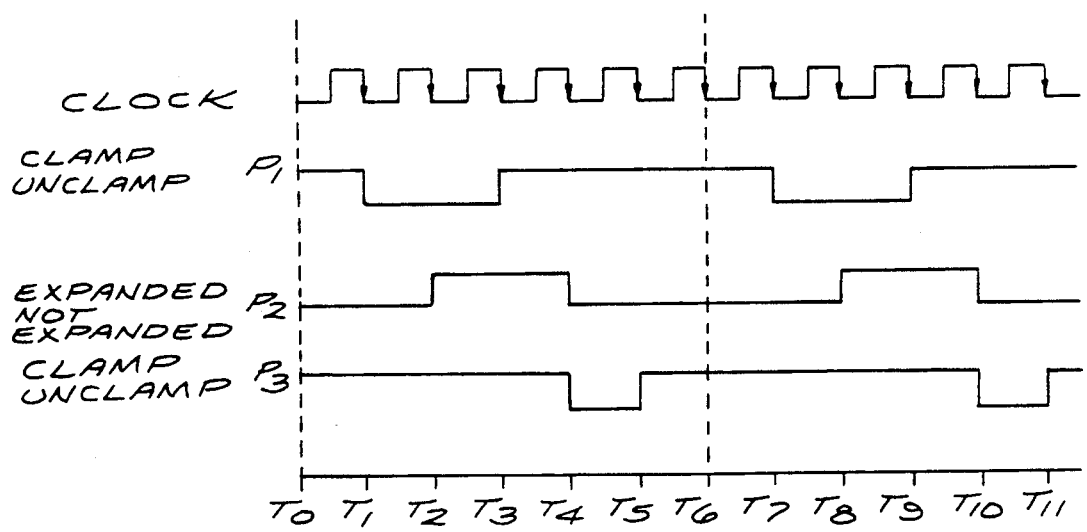
FIG. 6 is a timing diagram of the logic sequencing for stepwise movement of the translator of FIG. 7 is a timing diagram for fine scanning movement of the translator of FIG. 1.

With reference to the simple one dimensional translational assembly and the simplest electrical sequencing circuitry illustrated in FIG. 4, the operation of the logical sequencing of a translation device for linear movement will now be described, further with reference to the timing diagram in FIG. 6. The timing diagram illustrates a typical sequencing for movement in the direction of the front piezoelectric member. At $T_0$ the front and rear piezoelectric members $P_1$ and $P_3$ are clamped, and the central piezoelectric member $P_2$ is unextended, holding the translation device in a stable position. At $T_1$, the front piezoelectric member $P_1$ is unclamped, preparing for extension of the central piezoelectric members $P_2$ at $T_2$, which moves the front piezoelectric leg in a forward direction. At $T_3$ the front piezoelectric drive leg having reached its full extension, again clamps. At $T_4$, the rear piezoelectric drive leg unclamps, in unison with the contraction of the central piezoelectric member to bring the rear piezoelectric member $P_3$ along in the forward direction. The rear piezoelectric member $P_3$ again clamps at $T_5$ to secure the translation assembly in a stable position, further forward in the stationary base member. The logical sequencing steps may be again repeated at $T_7$ through $T_{11}$, for continued forward movement, or the steps may be reversed, for rearward movement. It should be readily apparent that similar logical sequencing for the two-dimensional translator embodiment for clamping, unclamping and extending the upper drive legs which are perpendicular to the lower drive legs, will also serve to provide translational motion of the upper movable base member.

The upper movable base member can thus be caused to move in a series of extremely fine rectilinear steps, typically 10 microns or less, for two-dimensional positioning of an object carried on the upper movable base member, such as a stage for microscopes or other types of high resolution targeting devices.

Figure 7:
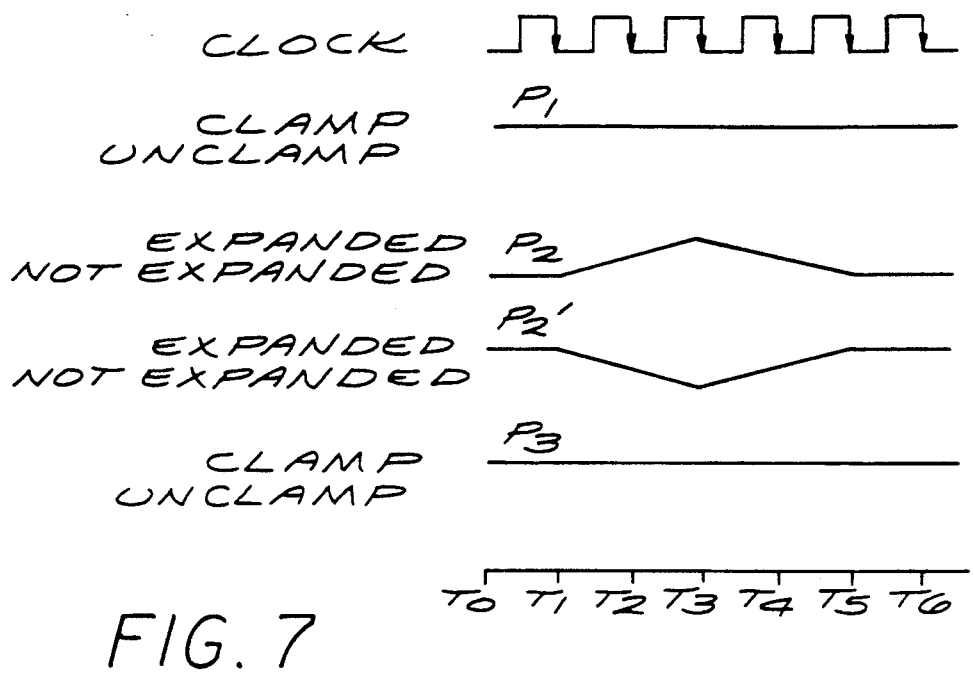
Figure 8:
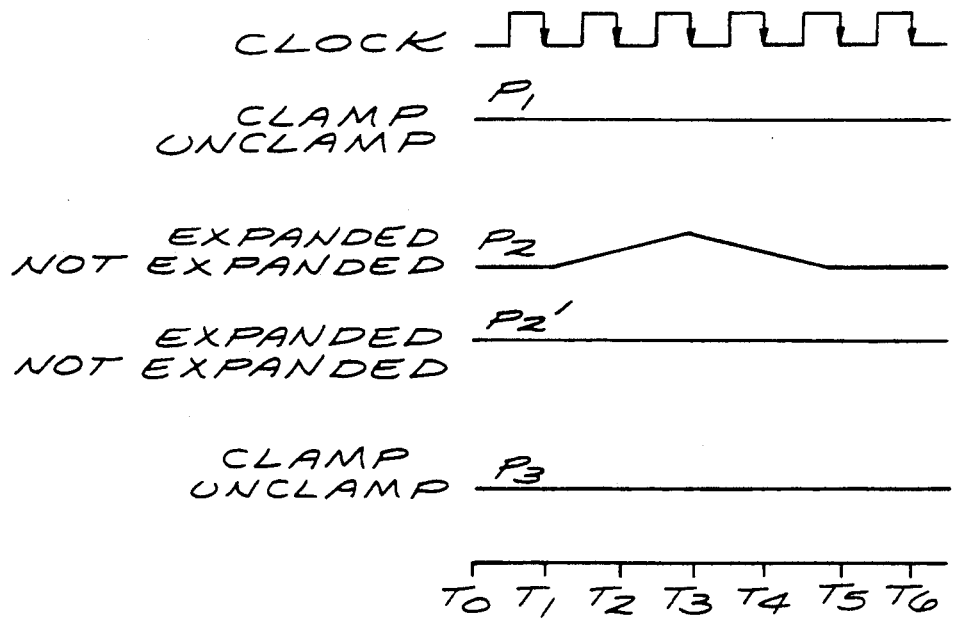
FIG. 8 is an alternative timing diagram for fine scanning movement of the translator of FIG. 1.

Referring to FIGS. 7 and 8, a particularly advantageous method of operating the translating device in the stationary base member for a gradual one-dimensional scanning motion, or further translating the movable base member to allow a very fine, gradual two-dimensional scanning pattern, involves the clamping of at least one leg in each pair of opposing legs, and ramping the voltage to at least one of the central piezoelectric stacks. FIG. 7 illustrates the timing diagram for clamping a front leg $P_1$ and a rear leg $P_3$, gradually increasing and decreasing the voltage to gradually expand and contract a front central piezoelectric stack $P_2$ while simultaneously decreasing and increasing the voltage to gradually contract and expand a rear central piezoelectric stack $P_2'$ in an opposing, coordinated manner, causing the central body to smoothly scan back and forth. Two-dimensional raster scanning of the upper movable base can be achieved by combining a similar scanning pattern of the front and rear legs, or of the upper central piezoelectric stacks with the scanning pattern of the lower portion.

The timing diagram illustrated in FIG. 8 provides for clamping of only one leg while the other opposing leg is unclamped for free movement, and in this case only one central piezoelectric stack would be activated for gradual expansion and contraction. The kind of scanning pattern shown in FIG. 8 could be used to generate a linear scanning motion of the translation assembly along the stationary channel member, and could be combined with a scanning pattern generated for the upper movable base member according to a timing sequence such as is shown in FIG. 7. The timing sequence of FIG. 7 would also be useful for generating a scanning motion of a more simplified form of the translation assembly having only one central piezoelectric stack for expansion and contraction in each dimension. Either form of the scanning pattern will be useful in generating infinite degrees of positional resolution.

Another embodiment of the invention as a one-dimensional "channel walker" electromechanical translation apparatus 110 is illustrated in FIGS. 9-12. A stationary base 112 is preferably placed in a stable position on a platform, or fixedly mounted to such a platform in a horizontal position. A first pair of bearing members 114 $a$, $b$ are located at one edge of the upper surface of the lower base member, spaced apart to receive a leg of the translation drive assembly. A second pair of bearing members 114 $c$, $d$ are located at the opposite edge of the upper surface of the lower base, and are similarly spaced apart to receive the opposite drive leg of the translation assembly. Bearing members 114$a$, $b$, $c$, $d$ preferably face upward, and are preferably formed as individual posts extending from a base connecting plate portion 116, having a central opening 119 therethrough, and upon which the translational drive assembly 117 rests.

The translation drive assembly includes a front primary drive leg 118$a$, and a rear primary drive leg 118$b$. Pairs of clamping drive members 122$a$, $b$, and 122$c$, $d$, which may be any common electromechanical transducers, and which are preferably piezoelectric ceramic stacks, are mounted within bores in the bearing members, 114$a$, $b$, $c$, $d$ preferably by set screws 114$a$, $b$, $c$, $d$. Each of the clamping drive members include precisely machined feet 123$a$, $b$, $c$, $d$, which are currently also preferably formed with epoxy cement, at the exterior ends of the stacks extending from the bearing members on either side of, and adjacent to the drive legs. Although the clamping drive members are illustrated as being symmetrically positioned in the bearing members, in front and rear pairs, the clamping drive members would allow a gross walking motion of the translation drive assembly if only one front piezoelectric stack and one rear piezoelectric stack were provided, as the side of the drive leg could be clamped against the opposite bearing member. However, as will be explained later, there are advantages to providing pairs of clamping drive members.

Figure 13:
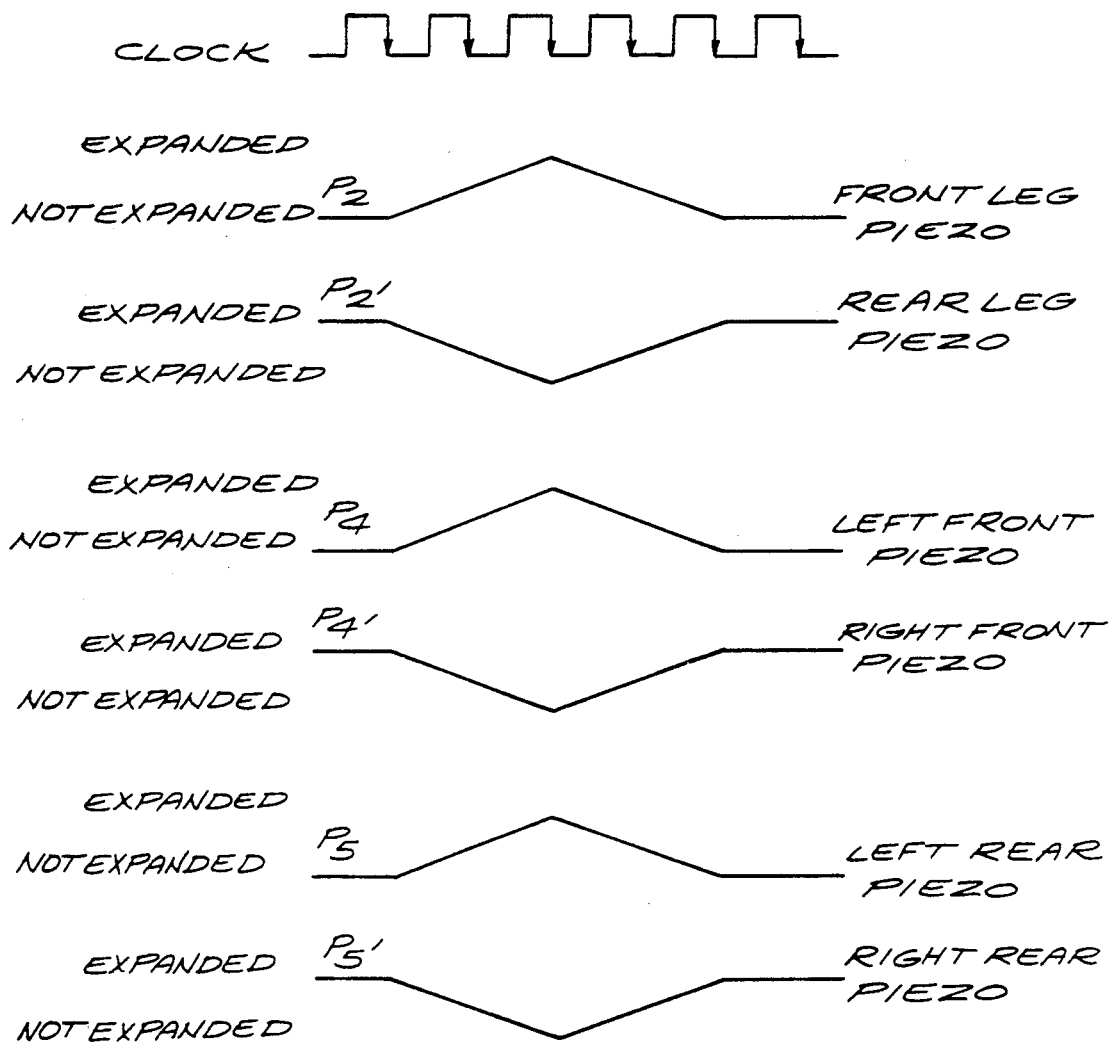
FIG. 13 is a timing diagram for two dimensional scanning in place with the embodiment of FIG.

The one-dimensional translation drive assembly includes a central body 124, preferably having a central opening 125, and at least two center piezoelectric ceramic stack members 126a, b, coupled to the primary drive legs by epoxy bonds 127a, b. Although epoxy cement is currently preferred, other bonds, such as adhesive or mechanical fasteners would of course, be suitable. Set screws 128a, b in the drive legs may also be used to releasably secure one end of the piezoelectric transducers 126 a, b which are free to expand or contract at their middle, while set screws 129 a, b are used to releasably secure the other ends of the transducers in the central body. The electrical connections to the piezoelectric stacks are essentially identical to those illustrated in FIG. 4. As will be readily appreciated, in this embodiment the bearing members need not be machined carefully to have extremely flat, smooth, parallel sidewalls since clamping adjustments can be simply and easily made by the set screws in the bearing members, and by the transducers in the bearing members themselves. A smooth base connecting portion allows the translation assembly to function as a "channel walker" to negotiate between the bearing members with extremely high resolution. If the front and rear drive legs are clamped simultaneously between the front and rear pairs of bearing members, two dimensional motion of the central body is possible, as shown in the timing diagram of FIG. 13. While the transducers $P_2$ and $P_2'$ for the front and rear legs are oppositely expanded and contracted, moving the central body forward and back, the front and rear pairs of bearing member transducers $P_4$, $P_4'$ and $P_5$, $P_5'$ can similarly be oppositely expanded and contracted to provide a side to side motion of the central body, resulting in a two-dimensional motion.

Figure 14:
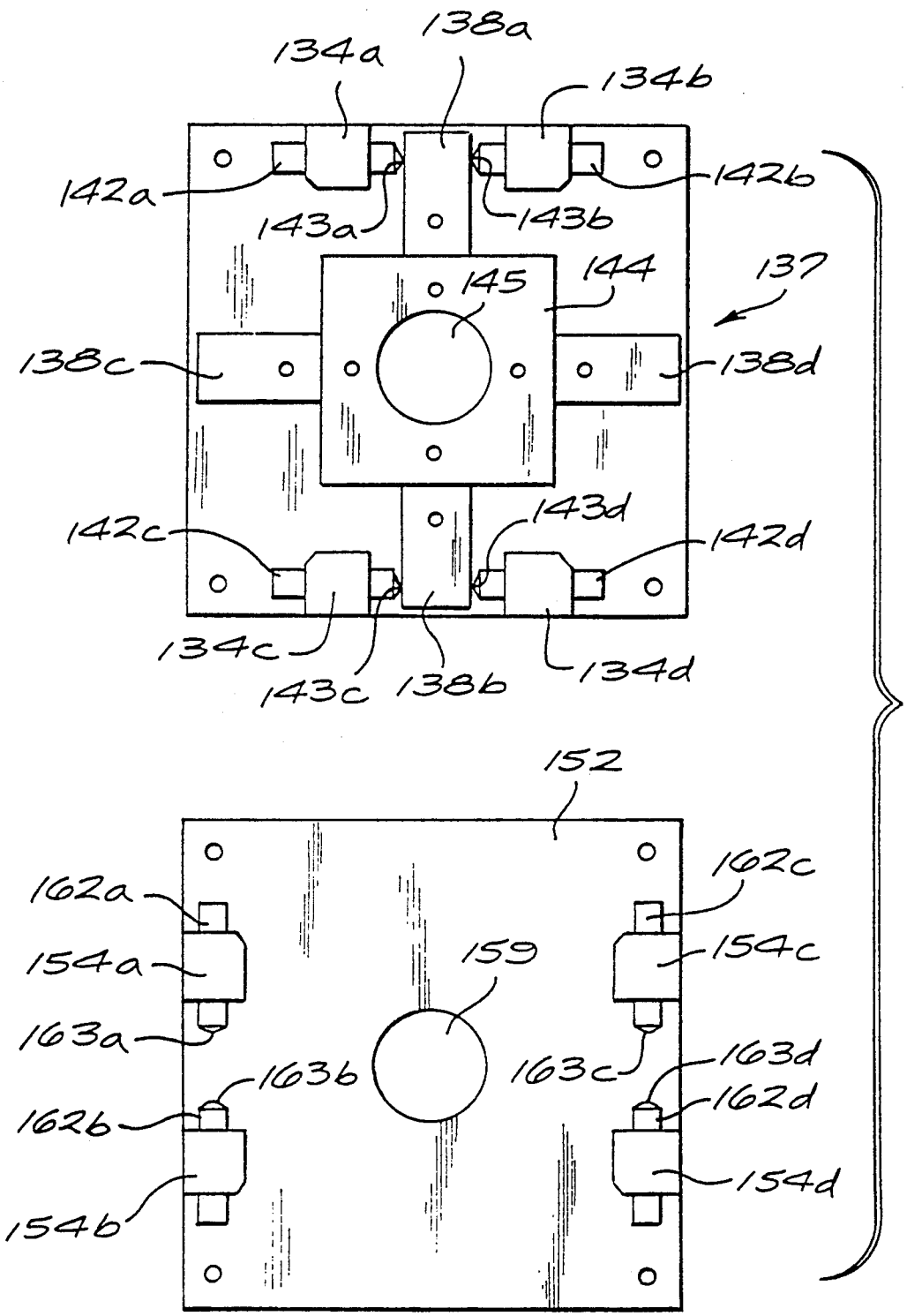
FIG. 14 is a top plan view of another embodiment of a two dimensional translation assembly in a lower base, and of the upper base.
Figure 15:
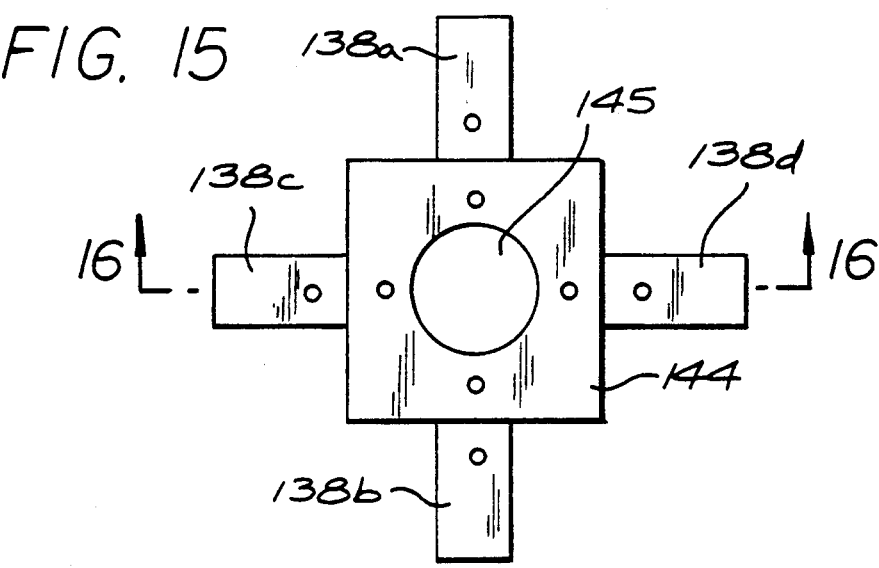
FIG. 15 is a top plan view of the translation assembly of FIG. 14.

The translation apparatus of FIGS. 9-12 can also be configured to provide a two-dimensional translation stage, as is illustrated in FIGS. 14 and 15. The construction of the lower portion of the two-dimensional translational apparatus 130 is essentially the same as for the translation apparatus shown in FIGS. 9-12. A stationary bearing member base 132 is provided, preferably placed on or mounted to a stable platform. Bearing members 134a, b, c, d preferably face upward, and are preferably in the form of individual posts connected together by the base connecting plate portion 136 which carries the translation assembly 137.

As is illustrated in FIGS. 14 to 18 the two-dimensional translation assembly 137 includes the front and rear drive legs 138a, b, and side drive legs 138c, d. The front and rear pairs of piezoelectric clamping drive members 142a, b, c, and d are mounted in bores in the lower bearing members 134a, b, c, d with the external feet 143 a, b, c, d mounted thereon. The lower bearing members are preferably formed in the lower base connector plate 136, and the lower piezoelectric drive members 142a, b, c, d are positioned and set in place by the set screws 140a, b, c, d. The central body portion 144, which includes the central opening 145 therethrough, is coupled to the front, rear, and two side central piezoelectric ceramic stack members 146a, b, c, d, by set screws 149a, b, c, d. Epoxy bonds 147a, b, c, d may also be used to couple the front and rear and two side drive legs to the front and rear piezoelectric members.

The upper movable bearing member base 152 has a construction similar to that of the lower stationary bearing member base, and includes upper bearing members 154a, b, c, d formed as pairs of individual posts in central base connecting plate portion 156, which also includes a central opening 159. Piezoelectric clamping drive members 162a, b, c, d are mounted in the upper bearing members and can be positioned and set in place with the set screws 160a, b, c, d. Precisely machined epoxy feet 163a, b, c, d are attached to the ends of the upper piezoelectric clamping drive members facing inwardly toward the four drive legs of the translation assembly. The combination of the lower bearing member base opening 139, the translation assembly opening 145, and the upper, movable channel member opening 159 permits light to pass through these openings, so that the translation apparatus may be used as a stage for an optical microscope. The two side drive legs 138c, d are mounted to the central body perpendicular to the front and rear drive legs. The upper movable bearing member base is placed over and carried by the central body, with the two side drive legs extending between the bearing members of the movable member. Each of the piezoelectric ceramic stack members is individually and selectively actuatable to expand to provide the motile source for the clamping and extending functions of the translation drive assembly. The basic electrical connections to the piezoelectric ceramic stack members for this embodiment of the two-dimensional translation apparatus are essentially identical to that illustrated in FIG. 5.

For example, for the translation apparatus of FIGS. 9-12, and referring to the circuit diagram of FIG. 4, for the case in which the bearing members of the lower base include pairs of front and rear piezoelectric stack members for clamping action of the translation drive device, and the translation assembly includes one pair of central piezoelectric members for the extension movement, the front piezo circuitry would actuate the front pair of piezoelectric members, the center piezo circuitry would actuate the center pair of piezoelectric members, and the rear piezo circuitry would actuate the rear pair of piezoelectric members. Similarly, the electrical schematic diagram illustrated in FIG. 5 also relates to the embodiment of FIGS. 14 to 18 in which there are upper piezoelectric clamping members and the two side extending members on the central body carrying and translating the upper movable base.

From the foregoing, it should be clear that the upper movable base can thus be caused to move in a series of extremely fine rectilinear steps, typically 10 microns or less, for two-dimensional positioning of an object carried on the upper movable channel member, such as a stage for microscopes or other types of high resolution targeting devices, and that once the four translation assembly legs are clamped, the four central piezoelectric members can be individually actuated for translation of the upper movable base to allow a very fine, gradual two-dimensional scanning pattern. Such a procedure would involve the clamping of at least one leg in each pair of opposing legs, and ramping the voltage to at least one of the central piezoelectric stacks. The timing diagram illustrated in FIG. 7 may also be used for actuating the pairs of piezoelectric members $P_1$ and $P_3$ for clamping a front leg and a rear leg, gradually increasing and decreasing the voltage to gradually expand and contract a front central piezoelectric stack $P_2$ while simultaneously decreasing and increasing the voltage to gradually contract and expand a rear central piezoelectric stack $P_2'$ in an opposing, coordinated manner, causing the central body to smoothly scan back and forth. Two-dimensional raster scanning of the upper movable base can be achieved by combining a similar scanning pattern of the front and rear legs, with a similar scanning pattern of the two side legs.

It should also be readily apparent that the form of the bearing members as individual posts on the base plate simplifies manufacturing of the apparatus, and that the positioning and actuation of each piezoelectric expansion element are subject to individual adjustment and control, to allow highly precise and flexible control of the apparatus for two-dimensional translational motion.

Although specific embodiments of the invention have been described and illustrated, it is clear that the invention is susceptible to numerous modifications and embodiments within the ability of the those skilled in the art and without the exercise of the inventive faculty. Thus, it should be understood that various changes in form, detail and application of the present invention may be made without departing from the spirit and scope of the invention.

We claim:

1. An electromechanical translation apparatus, comprising:
   a first base member having a plurality of opposing bearing members;
   a translation drive assembly disposed between said bearing members, including two primary drive leg members extending in a first direction between said bearing members and two secondary drive leg members extending in a second direction perpendicular to said first direction;
   central drive means coupling said primary drive leg members together, and coupling said secondary drive leg members together, including at least one expansion member extending in said first direction for extending said primary drive leg members in said first direction, and at least one expansion member extending in said second direction for extending said secondary drive leg members in said second direction; each of said expansion members being selectively actuatable to expand and contract responsive to electrical drive signals;
   a second movable base member having a plurality of opposing bearing members;
   said translation drive assembly being disposed between said movable base member bearing members and carrying said movable base member;
   said central drive means further including at least one secondary expansion member extending in a second direction;
   means for selectively clamping said primary and secondary drive leg members between said bearing members of said first and second base members, respectively; and
   whereby said second, movable base member is capable of translational motion in said first and second directions.

2. The apparatus of claim 1, wherein said means for selectively clamping comprises at least one pair of said opposing bearing members, each of said bearing members in a pair having a piezoelectric transducer having an end portion disposed adjacent one of said drive leg members.

3. The apparatus of claim 1, wherein said means for selectively clamping comprises a primary set of first and second pairs of said bearing members, each said pair of bearing members including a pair of expansion members having end portions disposed on opposite interior sides of each of said bearing members in a pair adjacent said two primary drive leg members, respectively, and a secondary set of first and second side pairs of said bearing members, each said side pairs of bearing members including a pair of expansion members having end portions disposed on opposite interior sides of each of said bearing members in said side pairs of bearing members adjacent said two secondary drive leg members, respectively.

4. The apparatus of claim 1, including means for generating said electrical drive signals operatively connected to each of said expansion members for selectively actuating each said expansion member according to a predetermined sequence of voltage changes.

5. An electromechanical translation apparatus, comprising:
   a base member having first and second pairs of opposing bearing members;
   a translation drive assembly disposed between said bearing members;
   said drive assembly having at least first and second drive leg members, extending in a first direction between said bearing members;
   central drive means coupling said drive leg members together, including at least one first central expansion member and at least one second central expansion member extending in said first direction;
   means for selectively clamping said first and second drive leg members in a second direction between said first and second pairs of bearing members including first and second pairs of expansion members mounted in said second direction in said first and second pairs of bearing members, respectively, each of said pairs of expansion members having end portions disposed on opposite sides of said first and second drive leg members respectively, whereby said translation drive assembly is capable of translational motion in said first direction; and
   a movable base member having first and second pairs of opposing interior bearing members; said translation drive assembly carrying said movable base member and having third and fourth drive leg members between said movable base member pairs of bearing members; said central drive means further including at least one secondary expansion member extending in said second direction coupling said third and fourth drive leg members together, whereby said movable base member is capable of translational motion in said first and second directions.

6. The apparatus of claim 5, wherein said means for selectively clamping comprises piezoelectric expansion members is selectively actuatable to expand and contract responsive to electrical drive signals, whereby said translation drive assembly is capable of translational motion is said first and second directions.

7. The apparatus of claim 5, including means for generating said electrical drive signals operatively connected to each of said expansion members for selectively actuating each said expansion member according to a predetermined sequence of voltage changes.

* * * * *

UNITED STATES PATENT AND TRADEMARK OFFICE
CERTIFICATE OF CORRECTION

PATENT NO. : 5,260,622
DATED : November 9, 1993
INVENTOR(S) : Paul E. West

It is certified that error appears in the above-indentified patent and that said Letters Patent is hereby corrected as shown below:

Column 1, line 28, change "piezoeletric" to --piezoelectric--

Column 2, line 35, following "translator of" add --Fig. 1;--

Column 2, line 49, change "Fig." to --Fig. 9;--

Figure 16:
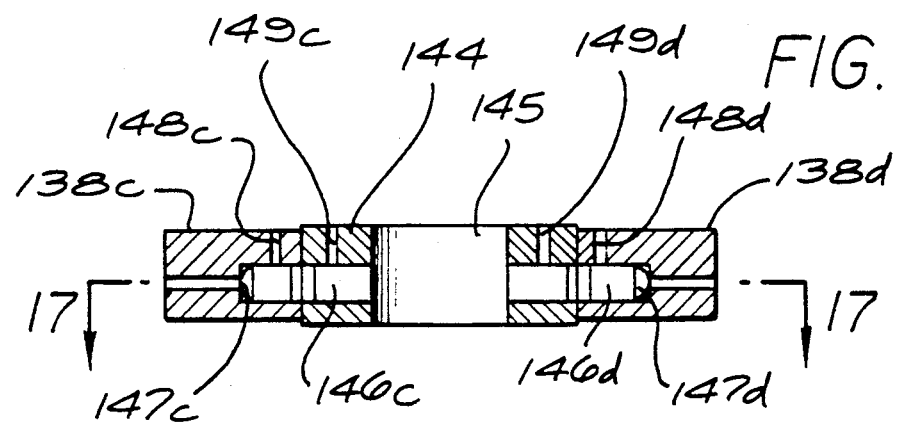
FIG. 16 is a cross-sectional view of the translation assembly of FIG. 15, taken along line 16—16.
Figure 17:
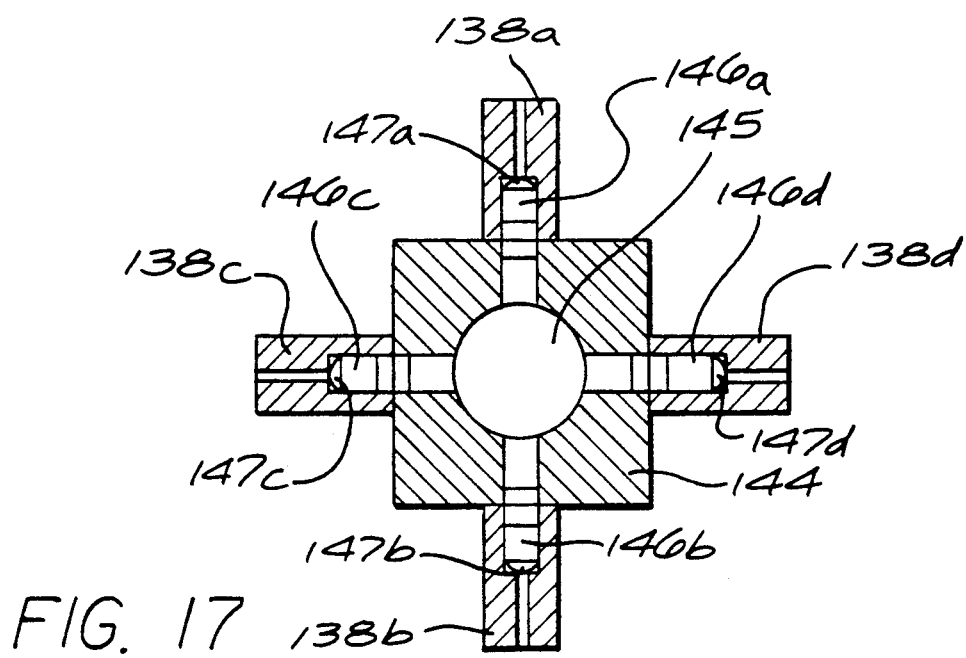
FIG. 17 is a cross-sectional view of the translation assembly taken along line 17—17 of FIG. 16.
Figure 18:
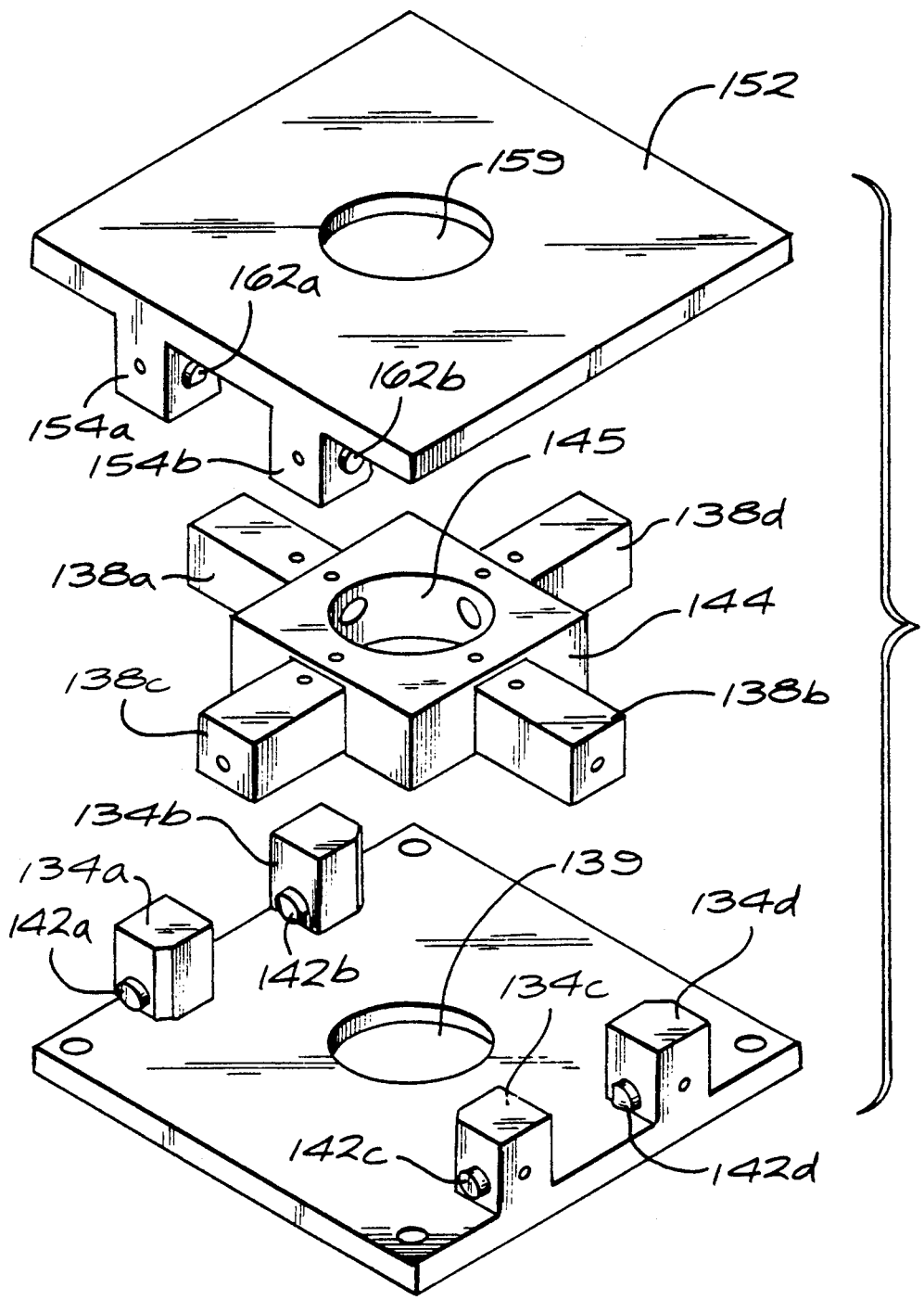
FIG. 18 is a perspective view of the embodiment of FIG. 14.

Column 2, line 58, following "Fig. 16;" add --and--

Column 5, line 8, change "P2" to --P3--

Signed and Sealed this

Thirty-first Day of May, 1994

Attest:

BRUCE LEHMAN

*Attesting Officer*     *Commissioner of Patents and Trademarks*